3,083,160
GREASE COMPOSITIONS
Peter J. V. J. Agius, Abingdon, Arthur L. Morris, Didcot, and Antony Winward, Wantage, England, assignors to Esso Research and Engineering Company, a corporation of Delaware
No Drawing. Filed Nov. 5, 1959, Ser. No. 851,021
Claims priority, application Great Britain Nov. 11, 1958
4 Claims. (Cl. 252—29)

The present invention relates to greases which are resistant to heat and to the effects of hot carbon dioxide, and which are suitable for use in lubricating moving parts associated with nuclear reactors.

Nuclear reactors for power stations comprise a nuclear reactor zone, a heat transfer medium, and a control mechanism. The nuclear reactor zone generates neutron fluxes of a high intensity by the transformation of uranium fuel into radiation and different forms of matter, the transformation being accompanied by substantial amounts of heat. The heat-transfer medium in many plants now being built consists of carbon dioxide, which transfers heat from the reaction zone to steam-raising plants. In such installations the carbon dioxide reaches high temperatures, e. g. of the order of 400° C., the hot carbon dioxide being circulated by fans. The nuclear transformation process is kept at a desired level by a graphite moderator in which the uranium fuel-rods are contained, the level of activity being capable of variation by the movement of control rods into the moderator. Such control rods may be made of a material capable of absorbing neutrons, such as boron steel. The control rods are operated by a mechanism whereby they can be lowered by gravity into the reactor zone. Besides the general day-to-day movement of the control rod mechanism, the mechanism must be capable of freely-operating in an emergency quickly to drop the control rods entirely within the reactor block, and thus must be adequately lubricated. Further, the fuel cans are manipulated by a charge-discharge apparatus, which may be placed beneath the moderator block, or may be a crane mechanism situated above the moderator block.

Both the fuel can charge-discharge and the control rod mechanisms are subject to radiation, due to their proximity to the main reactor zone within the so-called biological shield although the radiation intensity to which the control-rod mechanism is subjected is somewhat less than that experienced by the charge-discharge apparatus. Both may be subject to the influence of hot carbon dioxide gas, and both must be kept lubricated during long periods when they are not accessible. Thus the grease used for such lubrication must be resistant to the effects of radiation and hot carbon dioxide gas, must not become thin at high temperatures, and must be structurally stable, i.e. they must not bleed to a significant extent. This structural stability is of considerable importance.

The present invention is directed to greases which are resistant to the effects of hot carbon-dioxide-containing gas, and which are suitable for use in nuclear reactors of the kind described, and which are also structurally and viscosity stable under operating conditions in such reactors.

To this end, the invention provides a grease composition comprising a base mineral oil thickened to a grease consistency with carbon black, and which contains more than 5% and up to 50% by weight or more of at least one hydrocarbon polymer and/or copolymer.

A preferred hydrocarbon polymer used in the compositions of the present invention is polyisobutylene. Another preferred hydrocarbon polymer is polyethylene or polypropylene. Polystyrene may also be used.

The hydrocarbon polymers (or copolymers) used in the compositions of this invention preferably have an average molecular weight of up to 100,000. It is particularly preferred however that lower molecular weight polymers be used for greases exposed to high neutron fluxes, or to high temperatures. Such molecular weights may be up to 10,000, for example 500 to 2000.

The use of a single hydrocarbon polymer, for instance, polyisobutylene or polyethylene, may be sufficient when the mineral base oil used in the compositions itself has a substantial viscosity, for example, about 20 cs. at 210° F. For base oils of lower viscosity, e.g. about 5–20 cs. at 210° F., of which liquid paraffin is an example, it is desirable that two or more polymers and/or copolymers be employed. Thus a mixture of polyisobutylene or polyethylene and a rubbery copolymer may be used. Suitable copolymer is the so-called butyl rubber, consisting of a copolymer of a $C_4$–$C_8$ iso-olefin, e.g. isobutylene and a small proportion of a $C_4$–$C_6$ conjugated diolefin such as butadiene, dimethyl butadiene, piperylene or preferably isoprene. Copolymers of butadiene and styrene may also be used.

The amount of hydrocarbon polymer, copolymer or mixtures thereof incorporated in the base oil used in the grease formulations of the present invention should be sufficient to increase the viscosity of the base oil to at least about 35 cs./210° F., and preferably to 40–70 cs./210° F. Thus total polymer and/or copolymer may be up to 50% by weight or more, e.g. 30%–55%, based on the base oil i.e. more than 5% by weight. When hydrocarbon copolymers as hereinbefore described are employed as base oil thickening agents, the proportions used are limited by the solubility limit of the copolymer in the oil. For this reason the copolymers are usually used with the hydrocarbon polymers.

Although greases suitable for use in the presence of relatively low intensity radiation may be formulated using paraffinic oils, the amount of radiation exposure a mineral oil can tolerate increases with the aromatic content of the oil. Thus while predominantly paraffinic oils may be used such as white oils and liquid paraffins, aromatic-containing oils such as solvent-extracts from lubricating oil refining processes may be employed with advantage.

Whenever possible, grease formulations according to the present invention should contain as little sulphur as possible, to avoid contamination of metal parts such as fuel-rod containers, used in the nuclear reaction zone. Thus the sulphur content of the finished grease should preferably be below 1.0 by weight or less. Thus the base oil itself should have as low a sulphur content as possible. Oils which are highly-refined and easily obtainable are liquid paraffin or hydrofined white oil, and thus provide suitable base oils to provide low-sulphur greases according to the present invention.

It is also preferred that greases according to the present invention contain a minor proportion of an anti-oxidant, such as the well-known mineral oil anti-oxidants phenyl-naphthylamine, N,N'-di-secondary butyl p-phenylene diamine, 2:4 dimethyl-6-tert.-butyl phenol, 2:6 di-tert.-butyl 4 methyl phenol, bisphenols and phenothiazine. Such antioxidants may be present in proportions of about 1% based on the total weight of the grease.

The following examples show the increase in structural stability obtained with the grease compositions of this invention, containing a proportion of polyethylene of molecular weight 1500 as the hydrocarbon polymer ingredient, over similar grease compositions containing no polyethylene.

*Composition—Percent Weight*

| | Viscosity, cs./ 210° F. | Grease 1 | Grease 2[1] | Grease 3 | Grease 4[1] | Grease 5 | Grease 6[1] |
|---|---|---|---|---|---|---|---|
| Brightstock | 32.4 | 76.0 | 72.2 | | | | |
| Distillate mineral oil | 14.2 | | | 81.0 | 71.0 | | |
| Mineral oil phenol extract | 22.5 | | | | | 81.0 | 72.5 |
| Polyethylene | | | 6.6 | | 7.2 | | 7.1 |
| Acetylene black | | 23.0 | 20.4 | 18.0 | 20.8 | 18.0 | 19.4 |
| Phenyl-β naphthylamine | | 1.0 | 0.8 | 1.0 | 1.0 | 1.0 | 1.0 |

[1] Composition according to this invention.

The grease compositions were prepared as follows: The hydrocarbon polymer plus anti oxidant were dissolved into the oil which was at a temperature of about 120° C. The base-oil mixture was added slowly to the carbon black with constant stirring, which was continued for one hour after the complete addition of oil.

The high temperature stability of the greases were tested in the ASTM 1263 wheel bearing test which was run for 8 hours at 150° C. The results were as follows:

| Grease No.: | Wheel bearing test oil leakage (grms.) |
|---|---|
| 1 | 0.65 |
| 2 | 0.3 |
| 3 | 2.4 |
| 4 | 0.2 |
| 5 | 1.3 |
| 6 | 0.2 |

It will be noted that a marked reduction in oil leakage was obtained in the greases according to this invention (greases Nos. 2, 4 and 6).

Grease No. 2 was subjected to radiation and the stability after exposure measured by the ASTM 217 penetration test (mm./10) and the ASTM drop-point (° C.). The results were as follows:

| Radiation dose (rads) | Penetration | Drop point |
|---|---|---|
| 0 | 287 | >280 |
| 1×10⁸ | 303 | >280 |
| 1×10⁹ | 311 | >280 |

It will be seen that the physical properties of the grease were substantially maintained after heavy exposure to radiation.

The following examples show that grease formulations according to this invention containing polyisobutylene of molecular weight 1,000 as the hydrocarbon polymer ingredient retained its consistency under high temperature and radiation dosage in a manner similar to the similar grease compositions containing polyethylene as hereinbefore described.

The compositions of these further greases were as follows:

*Composition—Percent Weight*

| | Viscosity, cs./210° F. | Grease 7 | Grease 8 | Grease 9 |
|---|---|---|---|---|
| Distillate mineral oil | 14.7 | 48 | 24 | |
| Mineral oil phenol extract | 22.5 | | 24 | 47.4 |
| Polyisobutylene | | 32 | 32 | 31.6 |
| Acetylene black | | 19 | 19 | 20.0 |
| Phenyl-β naphthylamine | | 1 | 1 | 1.0 |
| Viscosity (cs./210) base oil mixture before addition of polyisobutylene | | 42.9 | 54.0 | 60.2 |

The results of these tests made on these greases were as follows:

| | Grease 7 | Grease 8 | Grease 9 |
|---|---|---|---|
| ASTM 1263 wheel bearing test (leakage grms.) | [1] 0.3 | | [2] 0.1 |
| Radiation stability, ASTM 217 penetration (mm./10) after radiation dosage: | | | |
| 0 | 297 | 278 | 294 |
| 1×10⁸ rads | 320 | 293 | 305 |
| 3×10⁸ rads | | 308 | 310 |

[1] At 120° C.  [2] At 150° C.

It will be seen that the greases of this invention behaved satisfactory in that they had good stability to radiation and high temperatures.

As an example of a grease (grease 10) according to this invention containing both a hydrocarbon polymer and a copolymer, a grease was made up according to the following formulation, and using the method of making substantially as hereinbefore described.

| | Weight percent |
|---|---|
| Liquid paraffin (viscosity 15 cs./210° F.) | 39.3 |
| Polyisobutylene (mol. wt. 1000) | 39.3 |
| Butyl rubber [1] (mol. wt. 40,000) | 0.4 |
| Acetylene black | 20.0 |
| Phenyl-β-naphthylamine | 1.0 |

[1] Copolymer of 98 isobutylene and 2% isoprene.

ASTM 1263 wheel bearing tests (160° C.) were carried out on grease 10, and on grease 11, grease 11 being compounded of 72% wt. of liquid paraffin thickened up with 18% of acetylene black. The results were as follows:

| | Grease 10 | Grease 11 |
|---|---|---|
| ASTM wheel bearing test, grease leakage (grms.) | 0.1 | 1.9 |

It will be noted that a very substantial reduction in grease leakage was obtained with grease according to this invention.

What is claimed is:
1. A grease composition consisting essentially of a mineral base oil thickened to a grease consistency with a carbon black, and containing more than 5% and up to 50% by weight total, based on the total composition, of at least one hydrocarbon polymer selected from the group consisting of polyethylene and polyisobutylene having a molecular weight of about 500 to about 2,000.
2. A grease composition as defined in claim 1 in which the hydrocarbon polymer is polyethylene.
3. A grease composition as defined in claim 1 in which the hydrocarbon polymer is polyisobutylene.
4. A grease composition resistant to radiation consist- ing essentially of a mineral lubricating oil thickened to a grease consistency with acetylene black and containing about 30 to 50 wt. percent based on the total composition, of polyisobutylene having a molecular weight of about 500 to 2,000.

References Cited in the file of this patent

UNITED STATES PATENTS 2,453,153    Morway ---------------- Nov. 9, 1948

FOREIGN PATENTS 710,109    Great Britain ------------ June 9, 1954

OTHER REFERENCES

"Radiation Resistant Greases," Bolt et al., AECU 3148, U.S. Atomic Energy Commission, June 30, 1956; California Research Corp., 33 pages, pages 3–5.